(12) United States Patent
Koga et al.

(10) Patent No.: US 6,229,552 B1
(45) Date of Patent: *May 8, 2001

(54) SYSTEM AND METHOD FOR AUTOMATIC MOTION GENERATION

(75) Inventors: Yoshihito Y. Koga, Menlo Park; Jean-Claude Latombe, Stanford, both of CA (US)

(73) Assignee: The Motion Factory, Fremont, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 08/681,301

(22) Filed: Jul. 22, 1996

Related U.S. Application Data

(60) Provisional application No. 60/001,336, filed on Jul. 21, 1995.

(51) Int. Cl.$^7$ .................................................. G06T 17/00
(52) U.S. Cl. ........................................... 345/474; 345/420
(58) Field of Search ..................................... 345/473, 474, 345/420, 421, 424, 425

(56) References Cited

U.S. PATENT DOCUMENTS 5,623,428 * 4/1997 Kunii et al. ........................ 345/473

* cited by examiner

*Primary Examiner*—Phu K. Nguyen
*Assistant Examiner*—Cliff N. Vo
(74) *Attorney, Agent, or Firm*—Willis E. Higgins; Richard M. Goldman; Cooley Godward LLP

(57) ABSTRACT

We apply manipulation planning to computer animation. A new path planner is presented that automatically computes the collision-free trajectories for several cooperating arms to manipulate a movable object between two configurations. This implemented planner is capable of dealing with complicated tasks where regrasping is involved. We have demonstrated the capability of this planner to generate realistic human arm motions involved in the manipulation of objects.

5 Claims, 4 Drawing Sheets

SYSTEM AND METHOD FOR AUTOMATIC MOTION GENERATION

This application is being converted from U.S. Provisional Application Ser. No. 60/001,336 filed Jul. 21, 1995.

INTRODUCTION

Mundane details keep us from vigorously attacking bigger ideas. This is the motivation for achieving task-level animation. From task-level descriptions, the animation of figures in a scene can be automatically computed by an appropriate motion planner. The animator can thereby concentrate on creating imaginative graphics, rather than laboring over the chore of moving these figures in a realistic and collision-free manner. We present herein our efforts toward realizing a subset of this ultimate goal—the automatic generation of human and robot arm motions to complete manipulation tasks.

Why study manipulation with arms? Human figures often play an integral role in computer animation. Consequently, there are arm motions and more specifically manipulation motions to animate. Another major application is in ergonomics. Since most products are utilized, assembled, maintained, and repaired by humans, and require for most cases some action by the human arms, by simulating and viewing these arm motions through computer graphics, one can evaluate the design of the product in terms of its usability. This will reduce the number of mock-up models needed to come up with the final design. Again, this would allow the designer more time towards creating high-quality products.

Unlike the motion of passive systems like falling objects or bouncing balls, the motion of human and robot arms for the purpose of manipulation are "motions within intentions." The arms move not through some predictable trajectory due to the laws of physics but with the intention of completing some task. A planner is needed to determine how the arms must move to complete the task at hand. Although there has been previous work on simulating walking and lifting motions, this is the first attempt to automatically generate complex manipulation motions.

Our problem is thus to find a collision-free path for the arms to grasp and then carry some specified movable object from its initial location to a desired goal location. This problem is known as the multi-arm manipulation planning problem. A crucial difference, relative to more classical path planning, is that we must account for the ability of the arms to change their grasp of the object. Indeed, for some task the arms may need to ungrasp the object and regrasp it in a new manner to successfully complete the motion.

We present a new planner that solves this multi-arm manipulation problem. The planner needs as input the geometry of the environment, the initial and goal configurations of the movable object and arms, a set of potential grasps of the movable object and arms, a set of potential grasps of the movable object, and the inverse kinematics of the arms. With appropriate book-keeping, the animator would simply specify the goal configuration of the movable object (a task-level description) to generate the desired animation.

The planning approach is flexible in regards to the arm types that can be considered. The only restriction is that the arms must have an inverse kinematics algorithm. In this regard we have experimented with various human kinematic models designed to emulate the "naturalness" of human movement.

FIG. 1 is a series of snapshots along a manipulation path computed by our planner. Once the necessary models of the environment are read by the planner, the input from the animator is simply the goal location for the eye glasses, in this case getting placed on the head. Note, the planner found automatically that the arms must ungrasp and regrasp the glasses in order to complete the task.

DESCRIPTION OF RELATED WORK

The novel techniques described herein for planning motions with intentions for robot and human arm manipulation are related to several different areas of research. We roughly classify this related work into two categories: (i) manipulation planning, and (ii) animation of human figures.

Manipulation Planning

Research strictly addressing manipulation planning is fairly recent. It considers a single-body robot translating in a 2D workspace with multiple movable objects. The robot, the movable objects and obstacles are modelled as convex polygons. In order for the movable objects to reach their specified goal the robot must "grasp" and carry them there. Wilfong shows that planning a manipulation path to bring the movable objects to their specified goal locations is PSPACE-hard. When there is a single movable object, he proposes a complete algorithm that runs in $O(n^3 \log^2 n)$ time, where n is the total number of vertices of all the objects in the environment. An $O(n^4)$ algorithm has been proposed to solve a similar problem where the robot and the movable object are both discs and the obstacles are polygonal.

Our work differs from this other research in several ways. Rather than dealing with a single robot, we consider the case of multiple human and robot arms manipulating objects in a 3D workspace. In addition, whereas the previous work is more theoretical in nature, our focus is more on developing an effective approach to solving manipulation tasks of a complexity comparable to those encountered in everyday situations (e.g. picking and placing objects on a table).

Regrasping is a vital component in manipulation tasks. A method has been described for planning a sequence of regrasp operations by a single arm to change an initial grasp into a goal grasp. At every regrasp, the object is temporarily placed on a horizontal table in a stable position selected by the planner. We too need to plan regrasp operations. However, the only regrasping motions we consider avoid contact between the object and the environment; then necessarily involve multiple arms (e.g. both human arms).

Grasp planning is potentially an important component of manipulation planning. In our planner, grasps are selected from a finite predefined set. An improvement for the future will be to include the automatic computation of grasps.

Animation of Human Figures

Human gaits have been successfully simulated. For example, a hybrid approach has been proposed to the animation of human locomotion which combines goal-directed and dynamic motion control. Similarly, the gait of a virtual insect has been simulated by combining forward dynamic simulation and a biologically-based motion coordination mechanism. Control algorithms have been successfully applied to the animation of dynamic legged locomotion. While dynamic models and the use of motor coordination models have been successfully applied to a wide range of walking motions, such a strategy has yet to be discovered to encompass human arm motions.

For simulating the motion of human arms, there exists methods for specific tasks. For example, arm motions for lifting have been simulated based on human muscle models. These methods consider such factors as comfort level, perceived exertion, and strength.

There has been previous work in applying motion planning algorithms to animating human figures. A motion planning algorithm for anthropometric figures with many degrees of freedom has been presented. Essentially, a sequential search strategy is; used to find a collision-free motion of the figure to a specified goal configuration. However, manipulation or imposing naturalness on the motions are not considered.

The AnimNL project at the University of Pennsylvania is working to automate the generation of human figure movements from natural language instructions. This principally involves determining a sequence of primitive actions from a high-level description of the task. They utilize models to create realistic motions, however complex manipulation motions have hitherto not been considered.

SUMMARY OF THE INVENTION

The present invention comprises a motion planning system for automatically determining trajectories; for motion of objects within a simulated environment in response to high-level task descriptions. The motion planning system is further capable of automatically determining the movements necessary for particular manipulative objects, such as human or other animate object entities, to move other objects to ]locations within the simulated environment.

In a preferred implementation the motion planning system includes a manipulation planner to which is provided geometric and kinematic models of animate and/or manipulative objects, as well as geometric models of inanimate objects. The motion planning system further includes a randomized path planner which, using a geometric model of the simulated environment, generates a set of non-intersecting paths for motion of both the manipulative and other objects within the simulated environment. The manipulation planner may further include a grasp planner for identifying locations at which manipulative objects may grasp other objects within the simulated environment. The grasp planner is also disposed to determine the manner in which an object is required to be passed between, or regrasped by, one or more of the manipulative objects in order to complete a given task.

BRIEF DESCRIPTION OF THE DRAWINGS

A specific embodiments of the invention will now be described, by way of example, with reference to the accompanying drawings in which.

DETAILED DESCRIPTION OF THE INVENTION

Manipulation Planner

Figure 1:
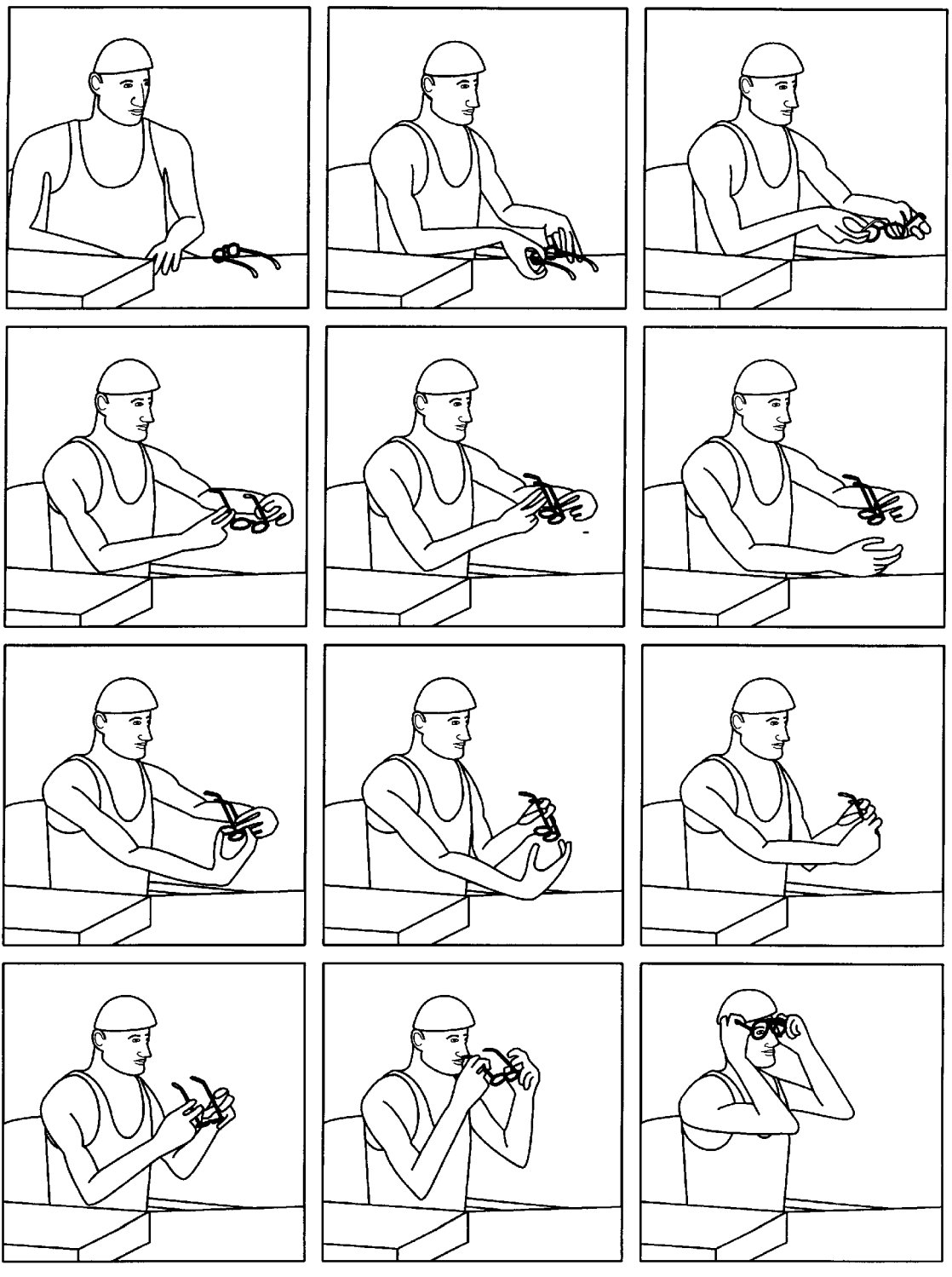
FIG. 1 shows a path generated for the motion of human arms in manipulating an object.

In this section we present our manipulation planning algorithm. The method applies to any system of arms as long as they have an inverse kinematics solution.

Problem Statement

We now provide a formulation of the multi-arm manipulation planning problems. We consider only a single movable object, but for the rest, our presentation is general.

The environment is a 3D workspace W with p arms $A_i(i=1, \ldots, p)$, a single movable object M, and q static obstacles $B_j(j=1, \ldots, q)$. The object M can only move by having one or several of the arms grasp and carry it to some destination.

Let $C_i$ and $C_{obj}$ be the C-spaces (configuration spaces) of the arms $A_i$ and the object M, respectively [19, 16]. Each $C_i$ has dimension $n_i$, where $n_i$ is the number of degrees of freedom of the arm $A_i$, and $C_{obj}$ has dimension 6. The composite C-space of the whole system is $C=C_1 \times \cdots \times C_p \times C_{obj}$. A configuration in C, called a system configuration, is of the form $(q_1, \ldots, q_p, q_{obj})$, with $q_i \in C_i$ and $q_{obj} \in C_{obj}$.

We define the C-obstacle region $CB \subset C$ as the set of all system configurations where two or more bodies in $\{A_1, \ldots, A_p, M, B_1, \ldots, B_q\}$ intersect. We regard joint limits in $A_i$ as obstacles that only interfere with the arms' motions. We describe all bodies as closed subsets of W; hence, CB is a closed subset of C. The open subset C/CB is denoted by $C_{free}$ and its closure by $cl(C_{free})$.

For the most part we require that the arms, object, and obstacles do not contact one another. However, M may touch stationary arms and obstacles for the purpose of achieving static stability. M may also touch arms when it is being moved. This is to achieve grasp stability and M can only make contact with the end-effector of each grasping arm (grasping may involve one or several arms). No other contacts are allowed.

This leads us to define two subsets of $cl(C_{free})$:

The stable space $C_{stable}$ is the set of all legal configurations in $cl(C_{free})$ where M is statically stable. M's stability may be achieved by contacts between M and the arms and/or the obstacles.

The grasp space $C_{grasp}$ is the set of all legal configurations in $cl(C_{free})$ where one or several arms rigidly grasp M in such a way that they have sufficient torque to move M. $C_{group} \subset C_{stable}$.

There are two types of paths, transit and transfer paths, which are of interest in multi-arm manipulation:

A transit path defines arm motions that do not move M. Along such a path M's static stability must be achieved by contacts with obstacles and/or stationary arms. Examples of such a path involve moving an arm to a configuration where it can grasp M or moving an arm to change its grasp of M. A transit path lies in the cross-section of $C_{stable}$ defined by the current fixed configuration of M.

A transfer path defines arm motions that move M. It lies in the cross-section of $C_{group}$, defined by the attachment of M to the last links of the grasping arms. During a transfer path, not all moving arms need grasp M; some non-grasping arms may be moving to allow the grasping arms to move without collision.

Figure 2:
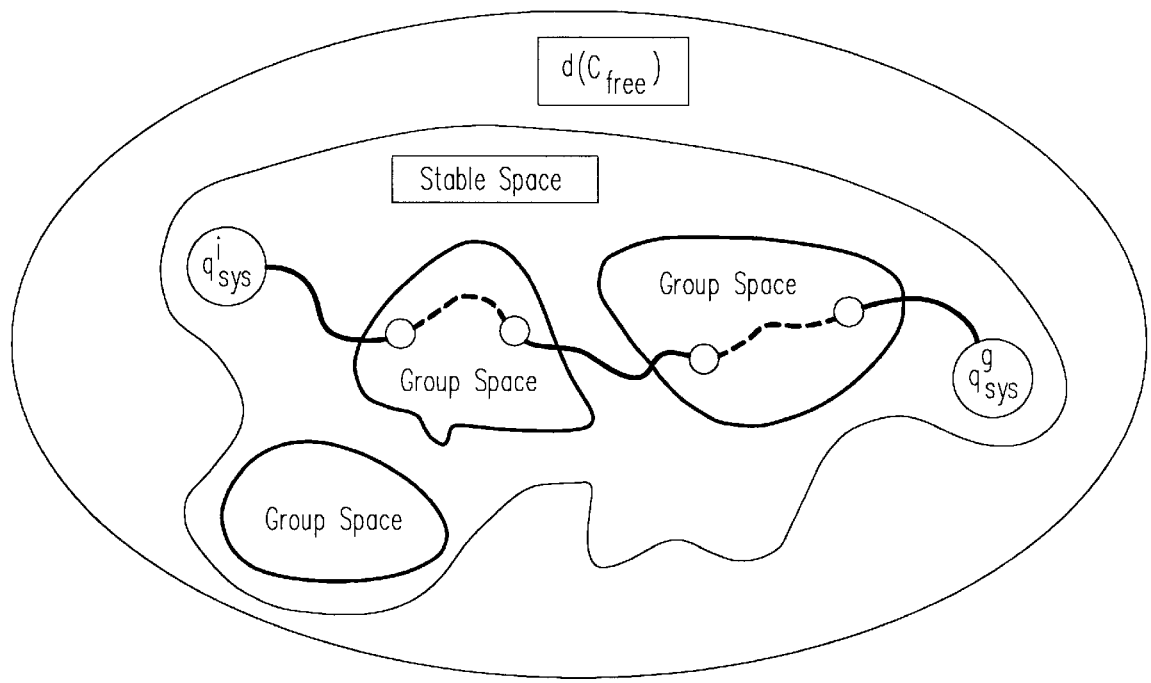
FIG. 2 shows a depiction of a transit path and a transfer path to acieve motion.

A manipulation path is an alternate sequence of transit and transfer paths that connects an initial system configuration $q^t_{sys}$, to a goal system configuration, $q^8_{sys}$ (see FIG. 2). Some paths in this sequence may be executed concurrently as long as this does not yield collisions.

In a multi-arm manipulation planning problem, the geometry of the arms, movable object, and obstacles is given, along with the location of the obstacles. The goal is to compute a manipulation path between two input system configurations.

Planning Approach

We now describe our approach for solving the multi-arm manipulation planning problem. This approach embeds several simplifications. As a result the corresponding planner is not fully general. Throughout our presentation, we carefully state the simplifications that we make. Some of them illustrate the deep intricacies of multi-arm manipulation planning.

Overview:

A manipulation path alternates transit and transfer paths. Each path may be seen as the plan for a subtask of the total manipulation task. This yields the following two-stage planning approach: first, generate a series of subtasks to achieve the system goal configuration; second, plan a transit or transfer path for each subtask. An informal example of a series of subtasks is: grasp M, carry it to an intermediate location, change grasp, carry M to its goal location, ungrasp.

Unfortunately, planning a series of subtasks that can later be completed into legal paths is a difficult problem. How can one determine whether a subtask can be completed without actually completing it? We settle for a compromise. Our approach focuses on planning a sequence of transfer tasks that are guaranteed to be completed into transfer paths. In fact, in the process of identifying these tasks, the planner also generates the corresponding transfer paths. With the transfer tasks specified, the transit tasks are immediately defined: they link the transfer paths together along with the initial and goal system configuration. It only remains to compute the corresponding transit paths.

The assumption underlying this approach is that there exists a legal transit path for every transit task. Actually, in a 3D workspace, this is often the case. If the assumption is not verified, the planner may try to generate another series of transfer tasks, but in our current implementation it simply returns failure.

Restrictions on grasps

To simplify the selection of transfer tasks, we impose a restriction on grasps. The various possible grasps of M are given as a finite grasp set. Each grasp in this set describes a rigid attachment of the end-effort(s) of one or several arms with M. For example, if M is considered too heavy or too bulky to be moved by a single arm, each grasp in the grasp set may indicate the need for a two-arm grasp. If the end-effector consists of multi-joint fingers, their joint values to achieve the particular grasp are specified.

Generating transfer tasks

The generation of the transfer tasks is done by planning a path $\pi_{obj}$ of M from its initial to its goal configuration. During the computation of $\pi_{obj}$, all the possible ways of grasping M are enumerated and the configurations of M requiring a regrasp are identified.

The planner computes the path $\pi_{obj}$ so that M avoids collision with the static obstacles $B_j$. This is done using a conventional RPP (Randomized Path Planner), which is thus a component of our planner. Exemplary randomized path planning techniques are described by, for example, Barraquand, Jerome and Latombe, Jean-Claude in "Robot Motion Planning: A Distributed Representation Approach"; *Int. J. Robotics Research*, 10(6), December 1991; pp. 628–649; and also by Latombe, Jean-Clause, in *Robot Motion Planning;* Kluwer Academic Publishers, Boston, Mass. (1991).

The RPP generates $\pi_{obj}$ as a list of adjacent configurations in a fine grid placed over $C_{obj}$ (the 6D C-space of M), by inserting one configuration after the other staring with the initial configuration of M. Conventional RPPs only check that each inserted configuration is collision-free. To ensure that there exists a sequence of transfer paths moving M along $\pi_{obj}$, we have developed a modified RPP. The modified RPP also verifies that at each insert configuration, M can be grasped using a grasp from the input grasp set. This is done in the following way. A grasp assignment at some configuration of M is a pair associating an element of the grasp set defined for M and the identity of the grasping arm(s). Note that the same element of the grasp set may yield different grasp assignments involving different arms. The modified RPP enumerates all the grasp assignments at the initial configuration of M and keeps a list of' those which can be achieved without collision between the grasping arm(s) and the obstacles, and between the grasping arms should there be more than one. We momentarily ignore the possibility that the grasping arm(s) may collide with the other non-grasping arms. The list of possible grasp assignments is associated with the initial configuration. Prior to inserting any new configuration in the path being generated, the modified RPP prunes the list of grasp assignments attached to the previous configuration by removing all those which are no longer possible at the new configuration. The remaining sublist, if not empty, is associated with this configuration which is appended to the current path.

If during a down motion of RPP (a motion along the negated gradient of the potential field used by the modified RPP) the list of grasp assignments pruned as above vanishes at all the successors of the current configuration (call it $q_{obj}$), the modified RPP rests the list attached to $q_{obj}$ to contain all the possible grasp assignments at $q_{obj}$ (as we proceed from the initial configuration). During a random motion (a motion intended to escape a local minimum of the potential, the list of grasp assignments is pruned but is constrained to never vanish. In the process of constructing $\pi_{obj}$, the modified RPP may reset the grasp assignment list several times.

If successful, the outcome of RPP is a path $\pi_{obj}$ described as a series of configurations of M, each annotated with a grasp assignment list. The path $\pi_{obj}$ is thus partitioned into a series of subpaths, each connecting two successive configurations. It defines as many transfer tasks as there are distinct grasp assignments associated with it. By construction, for each such transfer tasks, there exists a transfer path satisfying the corresponding grasp assignment. The number of regrasps along the generated path $\pi_{obj}$ is minimal, but the modified RPP does not guarantee that this is the best path in that respect.

Details and comments

The condition that the same grasp assignment be possible at two neighboring configurations of M does not guarantee that the displacement of M can be done by a short (hence, collision free) motion of the grasping arm(s). An additional test is needed when the set of grasps between two consecutive configurations is pruned. In our implementation, we assume that each arm has an inverse kinematics solution. Thus, an arm can attain a grasp with a finite set of different postures, determined by using the arms' inverse kinematics. We include the posture of each involved arm in the description of a grasp assignment. Hence the same combination of arms achieving the same grasp, but with two different postures of at least one arm, defines two distinct grasp assignments. Then a configuration of M, along with a grasp assignment, uniquely defines the configurations of the grasping arms. The resolution of the grid placed across $C_{obj}$ is set fine enough to guarantee that the motion between any two neighboring configurations of M results in a maximal arm displacement smaller than some prespecified threshold.

In addition, we make considerations for sliding grasps. Indeed, for some manipulation tasks, the object must be allowed to slide in the grasp of the arms to achieve the goal. For the grasp assignments in the grasp list, we identify their feasible neighbors and add them to the list. A neighboring grasp assignment is one where the grasp location and orientation is within some threshold from the original grasp assignment, and the same arm(s) and posture(s) is utilized. We choose a threshold distance that is small enough to ensure that it is feasible to slide between neighboring grasp assignments. By updating the grasp list in this manner, directions where a sliding grasp is necessary can then be explored during the search for an object path.

A transfer path could be obstructed by the arms not currently grasping M. Dealing with these arms can be particularly complicated. In our current implementation, we assume that each arm has a relatively nonobstructive configuration given in the problem definition (in the system shown in FIG. 1, the given nonobstructive configuration of each arm is when they are held out to the side). Prior to a transfer path, all arms not involved in grasping M are moved to their nonobstructive configurations. The planner nevertheless checks that no collision occurs with them during the construction of $\pi_{obj}$.

Perhaps the most blatant limitation of our approach is that it does not plan for regrasps at configurations of M where it makes contact with obstacles (as we said, $\pi_{obj}$ is computed free of collisions with obstacles). Since the object cannot levitate, we require that M be held at all times during regrasp. We assume that if M requires more than one arm to move, any subset of a grasp is sufficient to achieve static stability during the regrasp. For example, if a grasp requires two arms, any of these arms, alone, achieves static stability, allowing the other arm to move along a transit path. An obvious example where this limitation may prevent our planner from finding a path is when the system contains a single arm; no regrasp is then possible.

The modified RPP is only probabilistically complete. If a path exists for M, it will find it, but the computation time cannot be bounded in advance. Furthermore, if no path exists, RPP may run forever. Nevertheless, for a rigid object (as is the case for M), the modified RPP is usually very quick to return a path, when one exists. Hence, we can easily set a time limit beyond which it is safe to assume that no path exists.

The modified RPP includes a postprocessing step to smooth the jerky portions of the path, due to the random walks. Other path planners could possibly be used in place of the modified RPP.

Generation of transit paths

Figure 3:
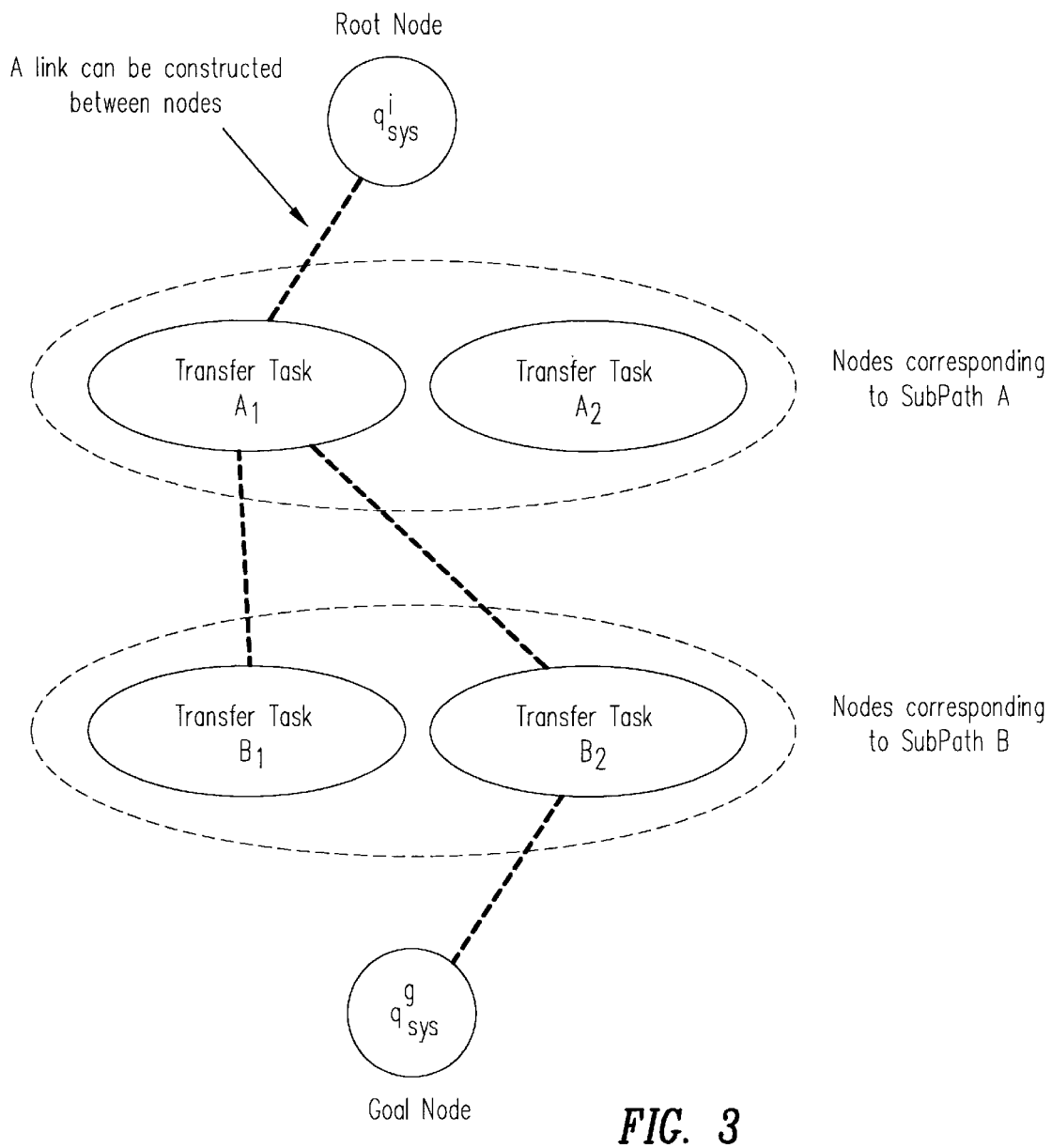
FIG. 3 shows the transfer tasks organized into layers.

The transfer tasks identified as above can be organized into successive layers, as illustrated in FIG. 3. Each layer contains all the transfer tasks generated for the same subpath of $\pi_{obj}$; the transfer tasks differ by the grasp assignment. Selecting one such task in every layer yields a series of transit tasks: the first consists of achieving the first grasp from the initial system configuration; it is followed by a possibly empty series of transit tasks to change grasps between two consecutive transfer tasks; the last transit task is to achieve the goal system configuration. Hence, it remains to identify a grasp assignment in each layer of the graph shown in FIG. 3, such that there exist transit paths accomplishing the corresponding transit tasks.

Assume without loss of generality that all arms are initially at their non-obstructive configurations. Our planner first chooses an arbitrary transfer task in the first layer. Consider the transit task of going from the initial system configuration to the configuration where the arms achieve the grasp assignment specified in the chosen transfer task, with M being at its initial configuration. The coordinated path of the arms is generated using RPP. If this fails, a new attempt is made with another transfer task in the first layer; otherwise, a transfer task is selected in the second layer. The connection of the system configuration at the end of the first transfer task to the system configuration at the start of this second transfer task forms a new transit task.

The transit task between two transfer tasks is more difficult to solve. Actually, the difficulty arises when an ungrasp/regrasp is required. If the initial and goal grasp assignments are neighbors, then we simply slide the grasp. To understand the difficulty of the case where an ungrasp/regrasp is required, imagine the situation where M is a long bar requiring two arms to move. Assume that the system contains only two arms and that the bar can be grasped at its two ends and at its center. Consider the situation where the bar is grasped at its two ends and the regrasp requires swapping the two arms. This regrasp is not possible without introducing an intermediate grasp. For example: arm 1 will ungrasp one end of the bar and regrasp it at its center (during this regrasp, arm 2 will be holding the bar without moving); then arm 2 will ungrasp the bar and regrasp it as the other end; finally, arm 1 will ungrasp the center of the bar and will regrasp it at its free end.

We address this difficulty by breaking the transit task between two transfer tasks into smaller transit subtasks. Each transit subtask consists of going from one grasp assignment to another in such a way that no two arms use the same grasp at the same time. In this process, we allow arms not involved in the first and last assignment to be used. We start with the first grasp assignment and generate all of the potential grasp assignments that may be achieved from it (assuming the corresponding transit paths exist). We generate the successors of these new assignments, and so on until we reach the desired assignment (the one used in the next transfer task). For each sequence that achieves this desired assignment, we test that it is actually feasible by using RPP to generate a transit path between every two successive grasp assignments. We stop as soon as we obtain a feasible sequence. The concatenation of the corresponding sequence of transit paths forms the transit path connecting the two considered transfer tasks. We then proceed to link to the next layer of transfer tasks.

When we reach a transfer path in the last layer, its connection to the goal system configuration is carried out in the same way as the connection of the initial system configuration to the first layer.

The result is an alternating sequence of transit and transfer paths that connects the initial configuration $q^t_{sys}$ to the goal configuration of $q^8_{sys}$.

Experimental Results

We implemented the above approach in a planner written in C and running on a DEC Alpha workstation under UNIX. Experiments were conducted with a seated human figure and a robot arm. Each human has seven degrees of freedom, plus an additional nineteen degrees of freedom for each hand. The non-obstructive configurations for the human arms are ones in which they are held out to the side. The robot has six resolute joints and three degrees of freedom for the end-effector. The non-obstructive configuration for the robot is one in which it stands vertically. In addition, we seat the human on a swivel chair. By adding this extra degree of freedom, we allow the arms to access a greater region, and hence tackle more interesting manipulation tasks. The rotation of the chair tracks the object to keep it, essentially, in an optimal position with respect to the workspace of the arms.

FIG. 1 shows a path generated by the planner for the human arms to bring the glasses on the table to the head of the human figure. We specify that both arms should be used to manipulate the glasses (this is defined in the grasp set). Notice that during the regrasping phase, at least one arm is holding the glasses at all times. For this path it took one minute to identify the transfer tasks and an additional two minutes to complete the manipulation path. For the generation of $\pi_{obj}$, the object's C-space was discretized into a 100×100×100 grid. For the generation of the transit paths, the joint angles of the arms were discretized into intervals of 0.05 radians. The grasp set contained 212 grasps, yielding grasp assignment lists with up to 424 elements.

Figure 4:
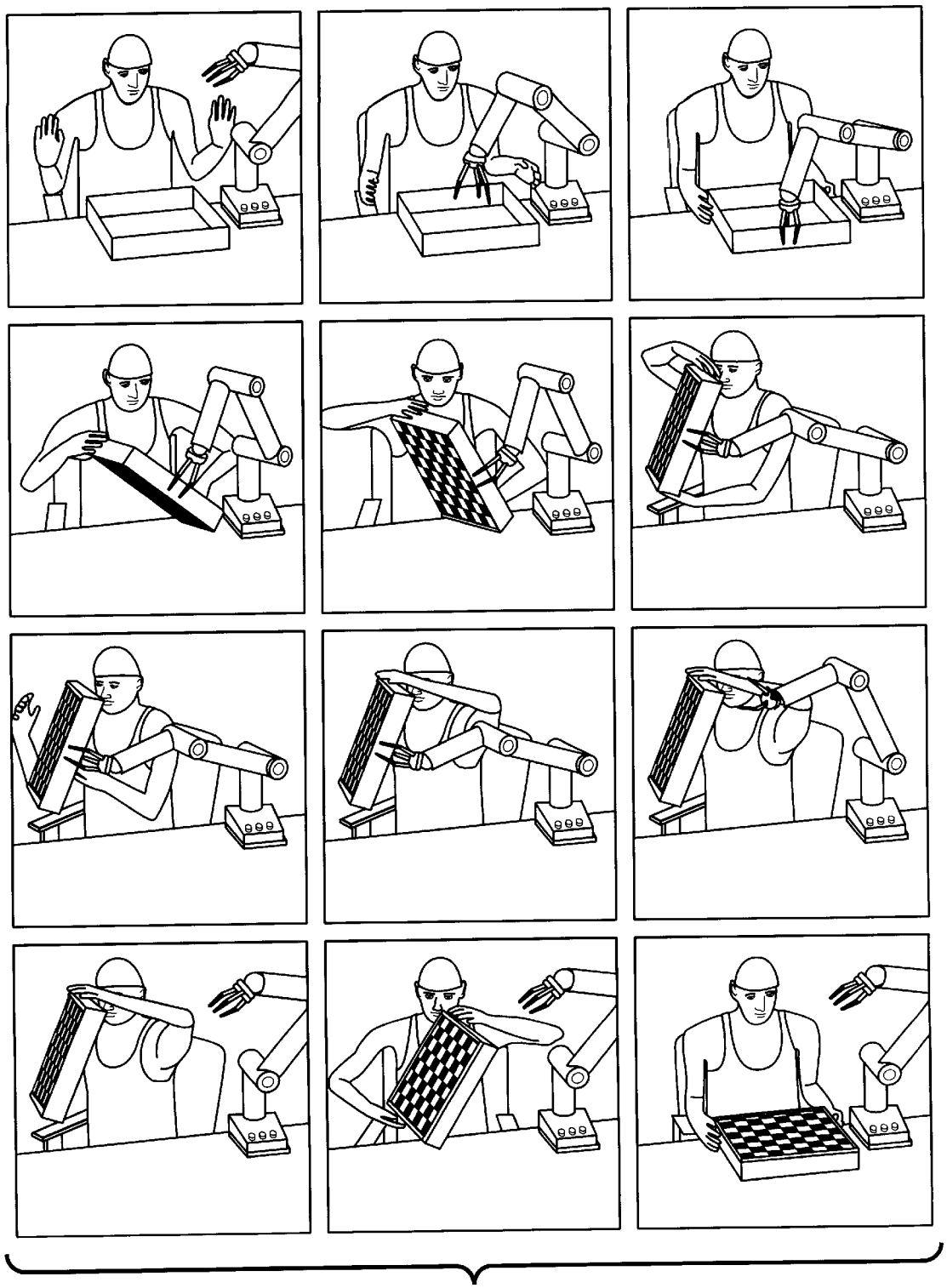
FIG. 4 shows a path generated for the motion of human arms and a robotic arm in manipulating a chess box.

FIG. 4 shows a path generated by the planner for the human arms and the robot arm cooperating to manipulate a chess box. Having the different arms working together presents no difficulty to our planning approach. The planner simply needs to know the correct inverse kinematics algorithm to apply to each arm. For this example, in defining the grasp set, we specify two classes of grasps, one in which all three arms are used, and another in which only the two human arms are utilized. For this path it took about one and a half minutes to identify the transfer tasks and an additional two minutes to the complete the manipulation path. The same discretizations as above were used. The grasp set of the box contained 289 grasps yielding grasp assignment lists with up to 2600 elements.

For manipulation planning with human arms, our current implementation is unable to plan motions where the arms are required to use their redundant degree of freedom to avoid obstacles. For example, a task where the arms must place an object deep into a tight box is almost impossible for our planner. The reason is simply that the sensorimotor transformation model does not consider obstacle avoidance. To tackle tigris class of problem, we will need to devise another inverse kinematics algorithm that does utilize the redundant degree of freedom for the purpose of avoiding obstacles. Again, some sort of naturalness constraint would need to be satisfied.

For these examples, in computing the transit paths RPP uses the sum of the angular joint distances to the goal configuration as the guiding potential. Note that the motion of the fingers for the human and the robot are considered in the transit paths (in moving from one grasp to another the fingers may change their posture). In computing $\pi_{obj}$ RPP uses an NF2-based potential with three control points. In finding both the transit paths and $\pi_{obj}$, we limit the amount of computation spent in RPP to three backtrack operations, after which the planner returns failure. Failure to find $\pi_{obj}$ results in the immediate failure to find a manipulation path. Similarly, a failure to find transit paths to link together the layers of transfer paths results in a failure to find a manipulation path. The time for the planner to report failure depends on the problem, with some examples ranging from 30 seconds to a few minutes.

Conclusion

We have presented a novel approach for solving the complicated multi-arm manipulation planning problem. Our approach embeds several simplifications yielding an implemented planner that is not fully general. However, experiments with this planner show that it is quite reliable and efficient in finding manipulation paths, when such paths exist, making it suitable as part of an interactive tool to facilitate the animation of scenes. We believe the robust nature of the planner is the result of careful consideration of the general manipulation problem, the introduction of reasonable simplifications, and the appropriate utilization of the efficient randomized path planner.

In the future we hope to include the ability to regrasp the movable object by having the arms place it in a stable configuration against some obstacles. We also plan to use existing results to automatically compute the grasp set of an object from its geometric model. Techniques describes for dealing with multiple movable objects in a 2D space should also be applicable to our planner. Furthermore, we hope to time parameterize the motion paths to yield realistic velocities, by implementing one of the many such algorithms for robot and human arms. Finally, we hope to explore and devise other inverse kinematics algorithms for the arms, as well as incorporating twisting and bending of the torso. Ultimately, we aim to create a task-level animation package for human motions.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. In a data processing system having a display, a method for generating a collision free path for grasping and carrying a movable object from an initial location to a desired goal location on the display for a human or human-like figure having grasps and grasping arms, based on task level commands, which method comprises:
   (a) specifying a geometric model of the human or human-like figure;
   (b) specifying a kinematic model of the human or human-like figure including joint constraints;
   (c) specifying a geometry of an environment in which object manipulation motion is to take place;
   (d) specifying a desired goal location in the environment of the object to be manipulated;
   (e) identifying locations within the environment at which the human or human-like figure can grasp the object to be manipulated and identifying and enumerating all sets of grasps and grasping arms which can be achieved without collision;
   (f) generating a collision-free path for the object to be manipulated and the human or human-like figure to move the object to be manipulated to the desired goal location, using the geometric model of the human or human-like figure, the kinematic model of the human or human-like figure, the geometry of the environment and a search algorithm
      (1) to generate a set of non-intersecting paths for motion of the human or human-like figure and the object to be manipulated,
      (2) to identify locations at which the human or human-like figure may grasp objects to be manipulated, and
      (3) to verify that at each said location the object may be grasped by a permitted grasp;
   (g) generating movement as a series of configurations of grasps, grasping arms and the object to be manipulated on the display of the human or human-like figure to grasp the object at one of the identified locations; and
   (h) generating movement as a series of configurations of grasps, grasping arms and the object to be manipulated on the display of the human or human-like figure to move the object to the specified goal location.

2. A method for generating and displaying a collision free path for a geometrically and kinematically modelled anthromorphic figure having grasps and grasping arms, to grasp and carry a movable object from an initial location to a desired goal location on a display which method comprises:
   (a) specifying a geometry of an environment in which object motion is to take place;

(b) specifying the desired goal location of the object;
(c) identifying locations at which the anthromorphic figure can grasp the object;
(d) identifying and enumerating all sets of grasps and grasping arms which can be achieved without collision;
(e) generating the collision-free path for the object and the anthromorphic figure to move the object to the desired goal location, using the geometric and kinematic models of the anthromorphic figure, the geometry of the environment and a search algorithm, the models, search algorithm, and geometry
  (1) generating a set of non-intersecting paths for motion of the anthromorphic figure and the object,
  (2) identifying locations at which the anthromorphic figure may grasp objects, and
  (3) verifying that at each location the object may be grasped by a permitted grasp; and
(f) generating movement of the anthromorphic figure and the object on the display as a series of configurations of grasps, and grasping arms to grasp the object at identified locations and move the object to the desired goal location.

3. The method of claim 2 comprising defining a finite set of grasps, each grasp describing a rigid attachment of at least one end effector of at least one grasping arm with the movable object.

4. The method of claim 2 comprising generating the collision free path, where said collision free path comprises:

(a) a series of configurations, each configuration associating a grasp and grasping arm, and (b) a series of subpaths connecting a pair of successive configurations.

5. The method of claim 2 comprising generating and displaying the collision free path for the geometrically and kinematically modelled anthromorphic figure having grasps and grasping arms, to grasp and carry a movable object from an initial location to a desired goal location on a display by implementing a high level command.

* * * * *